April 22, 1941.    J. A. SPENCER    2,239,540
THERMOSTATIC CONTROL
Original Filed Jan. 27, 1936    2 Sheets-Sheet 1
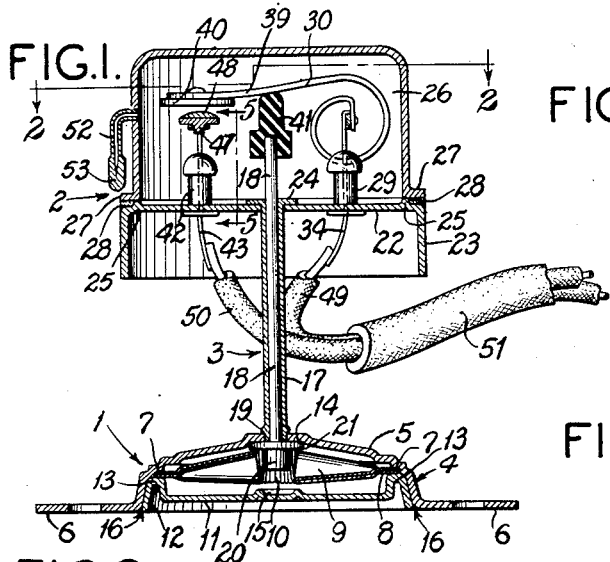
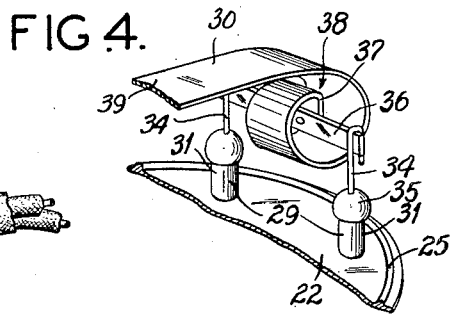
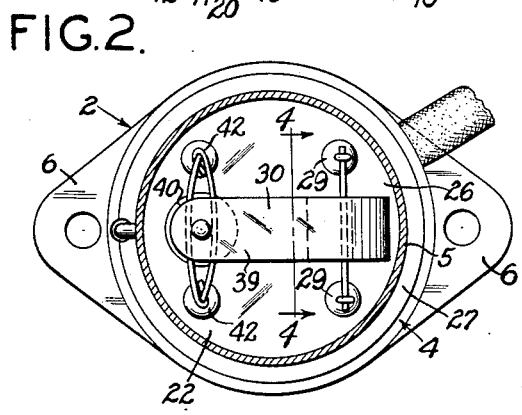
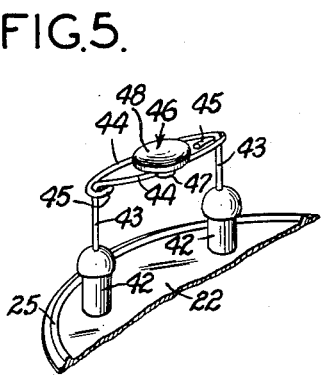
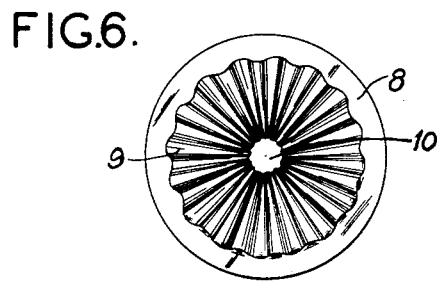
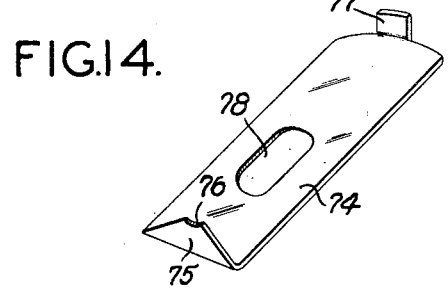
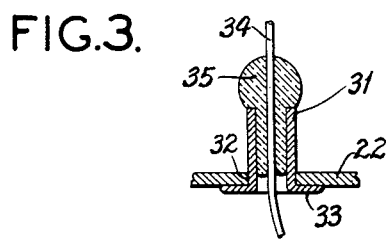
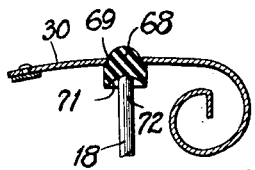
John A. Spencer,
Inventor,
Delor G. Haynes,
Attorney.

April 22, 1941.  J. A. SPENCER  2,239,540
THERMOSTATIC CONTROL
Original Filed Jan. 27, 1936   2 Sheets-Sheet 2
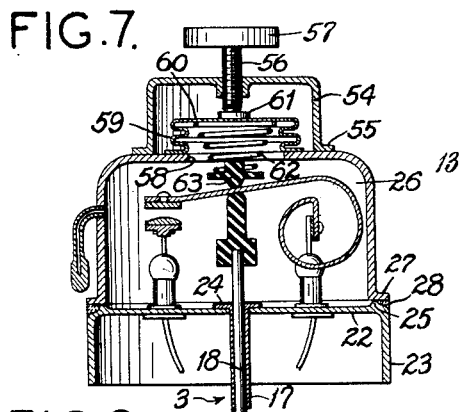
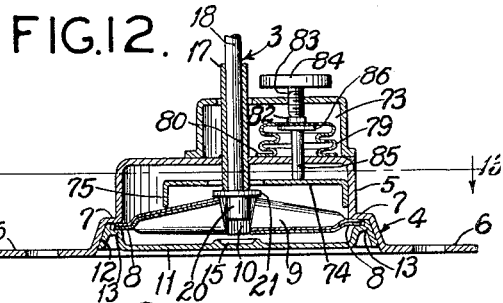
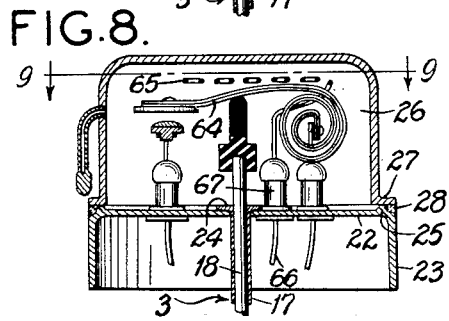
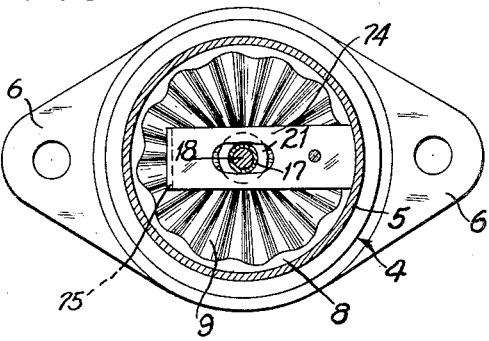
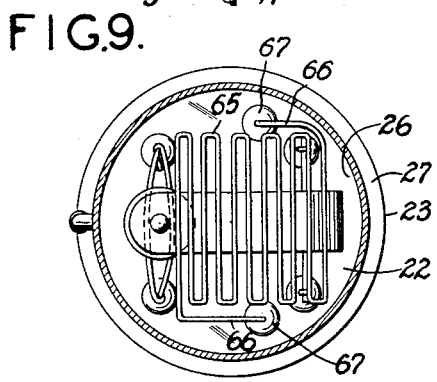
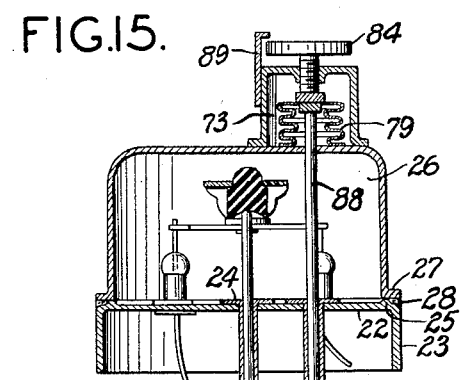
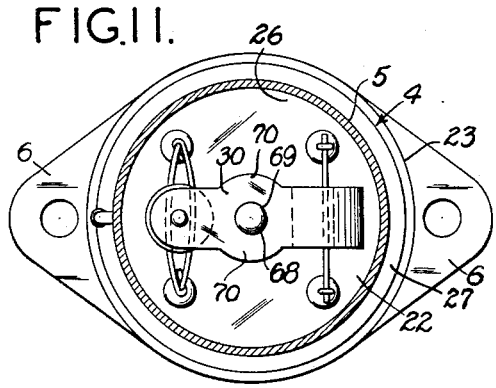
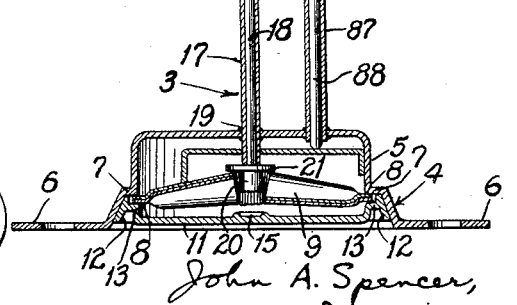

Patented Apr. 22, 1941

2,239,540

UNITED STATES PATENT OFFICE 2,239,540

THERMOSTATIC CONTROL

John A. Spencer, Newtonville, Mass., assignor, by mesne assignments, to Metals & Controls Corporation, Attleboro, Mass., a corporation of Massachusetts Application January 27, 1936, Serial No. 60,987
Renewed September 15, 1939

13 Claims. (Cl. 200—138)

This invention relates to thermostatic controls, and with regard to certain more specific features, to thermostatic electric controls.

Among the several objects of the invention may be noted the provision of a thermostatic control of the class described, wherein the entire operative mechanism is hermetically sealed within an envelope, so that the operative mechanism is not subject to deleterious ambient fluids, gases or the like; the provision of a control of the class described wherein the heat-absorbing capacity of the thermally responsive element is greatly reduced, whereby a more immediate response to changes of ambient temperature conditions is had; the provision of a thermostatic electric switch of the class described which is capable of handling increased electrical currents safely and successfully, and is at the same time capable of handling very small currents safely and successfully; and the provision of various means for adjusting or regulating the temperatures at which the aforesaid thermostatic control will be responsive. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible emobdiments of the invention—

Fig. 1 is a vertical axial section of a thermostatic electric switch embodying the present invention;

Fig. 2 is a cross-section taken substantially on line 2—2 of Fig. 1;

Fig. 3 is a fragmentary cross-section illustrating the construction of a lead-in element;

Fig. 4 is a perspective view of a portion of the switch of Fig. 1;

Fig. 5 is a perspective view of another portion of the switch of Fig. 1;

Fig. 6 is a plan view of a thermostatic element;

Fig. 7 is an axial section of a modified form of the switch of the Fig. 1 embodiment;

Fig. 8 is an axial section similar to Fig. 7, illustrating another type of switch;

Fig. 9 is a cross-section taken substantially along line 9—9 of Fig. 8;

Fig. 10 is a fragmentary view of an alternative construction;

Fig. 11 is a top plan view of a switch using the construction of Fig. 10;

Fig. 12 is an axial cross-section of a modified thermally responsive portion of the Fig. 1 embodiment;

Fig. 13 is a cross-section taken substantially on line 13—13 of Fig. 12;

Fig. 14 is a perspective view of an adjusting lever; and,

Fig. 15 is an axial section similar to Fig. 1 illustrating another alternative embodiment.

Similar reference characters indicate corresponding parts throughout the several views of the drawings.

Referring now more particularly to Fig. 1, it will be seen that a control in the form of an electric switch is shown, which comprises a thermally responsive portion 1, an electric switch portion 2, and an intermediate connecting portion 3. As will be pointed out more fully hereinafter, the portions 1, 2 and 3 are connected together in such a manner that they present a hermetically sealed envelope. The thermally responsive section 1 will first be described.

Numeral 4 indicates a base plate, which is provided with a cup-shaped portion 5 having mounting ears 6 extending therefrom. The cup portion 5 has an annular shoulder 7 therein, against which shoulder rests the flat periphery 8 of a radially corrugated, snap-acting thermostatic disc 9 which is made in accordance with my Patent No. 1,895,591, dated January 31, 1933. The construction and operation of the disc 9 will not be gone into at great length herein, reference being made to said patent for a more detailed description. Suffice it to say that the disc 9 has a central opening 10, and is so formed that it has two positions of opposite concavity or conicity. Upon change of ambient temperature past certain definite limits, the disc 9 snaps from one position of conicity to its other position. This snapping action in response to temperature change is utilized to effect a thermal control in the present invention.

An uncorrugated, non-developable thermostatic snap-acting disc of the type shown in my Patent No. 1,448,240, dated March 13, 1923, may likewise be used (in place of the corrugated disc 9), although in the majority of circumstances the corrugated type of disc is preferred because of its greater amplitude of movement when snapping.

Received in the cup portion 5 of the base plate 4 in such manner as to hold the thermostatic disc 9 in position, is a cover plate 11, which has a sloping flange 12 at its periphery, as well as a bead 13. The flange 12 fits tightly against the similar-sloping walls of the cup portion 5 of the base plate 4. The bead 13 holds the flat periphery 8 of the disc 9 against the shoulder 7, but in such a loose manner that the clamping does not interfere with the snapping action of the disc.

The cup portion 5 of the base plate 4 is provided in its center with a flat region 14, which serves as a stop to limit movement of the central portion of the disc 9 in one direction. A circular indentation 15 is similarly provided in the cover plate 11, to limit the central portion of the disc 9 when it moves in the opposite direction.

The cover plate 11 is preferably welded or soldered to the base plate 4 along the lines of their juncture, indicated at numeral 16, in order to hermetically seal these two elements together.

Extending upwardly from the center of the cup portion 5 of the base plate 4, and mounted thereon, is a tubular element 17, which slidably carries a rod 18 therein. The tube 17 is welded or soldered, as indicated at numeral 19, to the base plate 4, in order to hermetically seal these two elements together. The rod 18, which transmits the motion of the thermally responsive disc 9 to the control portion of the device 2, is terminated at its lower end by a cylindrical portion 20 and an outwardly extending flange 21. The cylindrical portion 20 is somewhat less in diameter than the hole 10 in the center of the thermostatic disc 9, and fits therein without binding. The flange 21 rests lightly against the upper, inner periphery of the thermostatic disc 9. The control portion 2 of the assembled device provides a resilient pressure on the rod 18 by means to be described, so that said flange 21 is always maintained in contact with said disc 9. Hence, when said disc snaps between its two positions, the rod 18 is oscillated longitudinally in the tube 17. The tube 17 and enclosed rod 18 comprise, together, the connecting means heretofore indicated by numeral 3.

The control portion 2 of the device will next be described. It comprises a base member 22, ordinarily of circular shape, which has an outer depending flange 23. The base 22 is mounted, at its center, upon the upper end of the tube 17, said tube 17 being outwardly flanged above the base 22 as indicated at numeral 24. The flange 24 is preferably welded or soldered to the base 22, in order again to provide a hermetically sealed joint. Near the outer edge of the base plate 22 there is provided an upstanding bead 25. Fitting against the bead 25 is a cup-shaped cover portion 26. The cover 26 has, at its lower extremity, an outwardly extending flange 27. In assembly, the lower edge of the cover 26 is juxtaposed to the bead 25 and electric terminals connected to the cover 26 and base 22, whereby the bead 25 partially melts or breaks down, welding the cover 26 on the base 22. Additional welding or soldering material indicated by numeral 28 may run in between the base plate 22 and the flange 27, to the depth of the remains of bead 25, in order hermetically to seal the cover 26 and the base plate 22 together.

Supported on the base 22 are the various elements together making up the electric switch of the present control. Numeral 29 indicates a pair of lead-in elements which function as supports for a spring lever 30 which constitutes the movable element of the switching device. The construction of the lead-in elements 29 is indicated more fully in Figures 3 and 4, where it will be seen that they each comprise a short metallic tube or tubular rivet 31 fitting snugly into an opening 32 in the base plate 22, the tube 31 being provided at its outer end with an outwardly extending flange 33 that is welded or soldered to the base plate 22. Through the tube 31 passes a connecting or supporting wire 34, and a short melted and congealed length of glass tubing 35 is positioned so as to seal the wire 34 in the tube 31. Thus is the wire 34 hermetically sealed into position, so that it may be used as an electrical conducting means into the interior of the assembly, but at the same time provide no leak for the enclosing envelope.

The wires 34, at their inner ends, are bent around and welded or soldered to a cross-bar 36, in order to support said bar. To the central portion of the cross-bar 36 is riveted, or otherwise secured, one end 37 of the spring 30. The spring 30, in the embodiment shown, is of the cantilever type; that is, it has a coiled portion 38 adjacent its fixed end 37, and a relatively long, flat portion 39 extending diametrically across the base 22. At the free end of the spring 30 there is riveted or otherwise secured a contact button 40, which is preferably made of a good contact metal, such as silver.

The flat portion 39 of the spring 30 extends across the center of the cup 26, and is there engaged by a lifting member 41 which is supported on the upper end of the rod 18. The lifting member 41 is preferably made of Bakelite or some other electrically insulating material. The spring 30, as has heretofore been intimated, is initially provided with such a torsion that it tends at all times to push the rod 18 downwardly, thereby maintaining the flange 21 in contact with the thermostatic disc 9.

The opposite side of the base plate 22 supports the relatively fixed contact assembly of the electrical switch. This comprises a pair of lead-in elements 42, similar to the elements 29 illustrated in Fig. 3, through which pass wires 43. The inner ends of the wires 43 (see Fig. 5) are bent toward each other, providing cross portions 44, and the ends 45 of the two wires are, respectively, wrapped about the other wire 43 and there welded or soldered. The cross pieces 44 of the wires 43 serve to support therebetween a fixed contact button 46, to which they are preferably soldered or welded. The contact button 46, as indicated in Fig. 1, preferably has a backing portion 47 which may be of any suitable welding metal, and a facing 48 thereon which is preferably of a good contact metal, such as silver. The facing 48 is in position to cooperate with the movable contact 40 on the spring 30, in order to make and break an electrical circuit between the wires 34 and 43.

Exterior connections are made to the switch by securing conduit wires 49 and 50, for example, to the projecting ends of the wires 34 and 43. The conduit wires 49 and 50 may be enclosed within a multiple conductor cable sheath 51, which is preferably itself hermetically sealed to the base 22, through means known to the art. In Fig. 1, part of the sheath 51 is shown as cut away, in order to show the connections more clearly. Under certain circumstances, it will be understood, it is not necessary to seal the sheath 51 to the base plate 22.

From the foregoing, it will be seen that all of the operating mechanisms of the assembly are sealed hermetically within an envelope which comprises the base 4, the cap 11, the tube 17, the base 22, and the cover 26. Numeral 52 indicates an exhausting tube or nipple which is secured to the cap 26. In assembly, the tube 52 is preferably connected to a vacuum pump, and air discharged from the envelope the end of tube 52 then being pinched and/or welded or sealed shut as indicated at numeral 53. Under these conditions, the envelope will be evacuated. Instead of sealing off the tube 52 upon evacuation of the device, however, the envelope can be wholly or partially filled with gases such as argon, helium, nitrogen, and the like, which serve to conduct heat away from the switch contacts rapidly, and thus to prolong their life. The gaseous filling can, of course, be at internal pressures above or below atmospheric values.

The operation of the device is as follows: Suppose, for example, that the form of the device illustrated in Fig. 1 is to be used in maintaining the inner temperature of an electric refrigerator within limits of, say, 40° to 45° F. To do this it has been found, say, that the surface of the cooling unit inside the refrigerator must be kept between 20° and 30° F. The present device is adapted for surface mounting on the cooling unit, the base plate 4 being fastened to some flat area of the cooling unit. The thermostatic disc 9 of such a control would be designed to have a snapping temperature of from say, 10° to 12° F. on change of temperature in one direction and from 38° to 40° F. on change of temperature in the other direction, the difference between these two temperatures, being 26° to 30° F., representing the thermal operating differential of the disc in consideration. This operating differential is that presented by the disc when its movement is totally unconfined. It is pointed out in previous patents of the present inventor that this differential is reduced by limiting the amplitude of the movement of the disc between its two opposite positions of conicity. Generally speaking, the differential is reduced in about the same proportion as the movement is reduced. For example, if the unrestricted movement is restricted by one-half, the differential is likewise cut to about one-half its former value.

As the desired variation or differential of the cooling unit temperature is only 10°, it is necessary to adjust the differential of the disc 9 to approximately the same value. This means that the movement of the disc must be restricted to approximately one-third of its movement under free conditions. This restriction of movement is effected, in the present device, by the positioning of the region 14 on the base plate 4, and the flange 15 on the cover 11, these constituting abutments limiting the movement of the disc, one in each direction.

Fig. 1 of the drawings shows the electrical switch in its "off" position, the surface of the chilling unit having reached the value of 20° F., and having transmitted that temperature through the base 4 to the thermostatic disc 9. The open circuit between contacts 40 and 48 means that the refrigerator compressor motor circuit is broken, and the refrigerating effect of the cooling unit is discontinued. The surface temperature of the cooling unit therefore commences to rise as it absorbs heat from the refrigerator. When, or shortly after the temperature of the surface reaches 30° F., the thermostatic disc 9 will have achieved the same temperature, and will snap to its lower position, thus permitting the rod 18 to move downwardly, and the spring 30 consequently to bring the contacts 40 and 48 into juxtaposition closing the compressor motor circuit. Refrigeration then begins, and the temperature of the cooling unit slowly drops until the aforesaid temperature of 20° F. is reached, when the cycle is repeated. The refrigerator temperature is accordingly maintained within the desired limits.

It is common in such refrigerators for considerable condensation and frost formation to take place, but since the operating parts of the present device are hermetically sealed within an envelope, this condensation and frost have no detrimental effect upon its operation.

The device as thus described, by reason of its completely sealed nature, may be exposed to or immersed in media which might otherwise be detrimental to its working. Further, by reason of the evacuation and replacement of the air in the system either with a vacuum or with non-oxidizing gases, the switch is capable of satisfactorily carrying currents of a relatively large order which are to be ruptured, say at infrequent intervals, by prolonging the life of the switch contact. By similar reasoning, it will be seen that the switch is capable of safely carrying current considerably larger than can successfully be carried by switch of equal size, in the air.

The switch is also particularly suited to the control of electrical currents in a very small order of current, because through the hermetical seal maintained, the contacting passages of the switch may be kept clean and free of atmospheric dust or contamination from other sources, such as, for example, the sulphur compounds which are ever present in the air in coal-burning regions.

Likewise by reason of the hermetically sealed condition of the device, it can be wholly or partially immersed, for operation, in such viscous materials as molten tar and pitch, paints, oils, and the like, or in solids in powdered or similar forms, and the like. Or it can be used in places, such as, for example, refrigerators, where condensation would otherwise affect it, or, in outdoor but unsheltered locations where the elements would otherwise destroy its working parts. Further, the device can be located in inflammable or explosive media where the arcing of open switch contact might otherwise result in ignition followed by fire or explosion.

The isolation of the thermally responsive portion of the device from the control element, achieved by reason of the tube 17 and rod 18, is particularly beneficial from a control point of view. The result is that the effective mass of the thermally responsive portion of the device, as a source of delay in response to temperature change, is kept small in relation to the total mass of the device. Moreover, the thermostatic element is so positioned with respect to its envelope that the temperature changes are readily transmitted to it by conduction, even though it is completely sealed from the atmosphere.

In the embodiment of the invention heretofore described, no provision has been made for means for adjusting the temperature at which the thermostatic disc 9 will snap, in distinction to the operating differential. Figure 7 shows one method of accomplishing this desired end. Referring to Fig. 7, it will be seen that there is mounted, on top of the cover 26, another cup-shaped cover 54, provided at its lower edge with an outwardly turned flange 55 which is preferably secured to the cap 26 by welding or the like. Centrally threaded in the top of the cap 54 is a set screw 56, having a knob 57.

In the center of the top of the cap 26 is provided a hole 58. Inside the cap 54, on top of the cap 26, there is welded or soldered a collapsible bellows element 59, which is open to the hole 58. The upper end 60 of the bellows 59 is closed, and carries a pillow block 61 against which the set screw 56 reacts. Fastened to the inside of the top 60 of the bellows 59 is a compression spring 62, the lower end of which receives an insulating button 63 which bears against the top of the spring 30 directly opposite the point of bearing of the lifting member 41. The bellows 59 is hermetically sealed to the cap 26, so that the hermetical seal of the envelope enclosing all moving elements is still maintained.

Compression spring 62 is a biasing spring which is loaded by adjusting the screw 56. Its force is transmitted to the thermostatic disc 9 by means of the lifting member 41, rod 18, and flange 21. In the upward snap of the thermostatic disc 9, the load of the biasing spring 62 is additive in effect to the inherent mechanical strains in the disc 9 which must be overcome by counterstrains in the disc induced by temperature change before the disc can snap. In the downward snap of the disc 9, the load of the spring 62 is subtracted from the inherent mechanical strains in the disc 9. Consequently it will be seen that by varying the load in the disc by spring 62, through adjusting of the screw 56, the temperature at which the disc responds in its upward and downward movements will also vary. Increasing the load of the spring 62 results in the need of a temperature in excess of the normal amount to cause an upward snap. However, since the load of the spring 62 on the downward snap is subtractive, the operating differential of the thermostatic disc 9 remains substantially unchanged. In other words, the range of temperature response is affected while the net amount of temperature change required to cause snapping is not.

In Figures 8 and 9 is shown another method of achieving control of the operating temperature of the thermostatic disc 9. In this embodiment, the spring 30, now indicated by numeral 64, is made from composite thermostatic metal, such as bimetal, its shape remaining substantially the same as the spring 30 of prior embodiments. Spring 64 is likewise mounted in the same manner as in prior embodiments. Numeral 65 indicates an electrical resistance heating grid which is positioned above the bimetallic spring 64 in such manner that when current flows through the grid, heat is radiated from the grid to the bimetallic spring 64. The ends 66 of the grid 65 are used for supporting said grid and are led through lead-in elements 67 mounted in the base plate 22. The lead-in elements 67 are similar to the lead-in elements 29 and 42 hereinbefore discussed. External connections are made to the wires 66 in the same manner as connections are made to the wires 34 and 43. The electric circuit including the grid is desirably provided with a rheostat or the like to vary the amount of current in the heating grid, and hence to vary the temperature of the bimetallic spring 64. The grid 65 has, of course, substantially no thermal effect upon the thermostatic disc 9.

In operation, the action of the embodiment of the Figures 8 and 9 is as follows:

In assembly the bimetallic spring 64 is set to expand downwardly and is adjusted to provide satisfactory contact pressure at temperatures outside the range of the temperatures at which the device is to be used. In the case of the refrigerator thermostat described, for example, the spring is set for satisfactory contact pressure at temperatures higher than will ever be used inside the refrigerator. This is done because at the lowest temperature of the device, the only function of the grid 65 is to radiate heat; it obviously can not have any cooling action below the refrigerator temperatures. The absorption of heat by the thermostatic spring 64 increases its contact pressure and its spring tension. The increase and decrease in spring tension changes the operating temperature of the disc 9, as explained in connection with the embodiment of Fig. 7.

Operation of the thermostatic spring 64 in the inverse manner is ordinarily unsatisfactory because, as its temperature is increased, the pressure between the contacts 40 and 48 is decreased, and the flow of current in the switch becomes less assured.

Figures 10 and 11 show a modification which may be applied to any of the foregoing embodiments of the invention. Instead of the lifting member 41, which engages the underside of the spring arm 30 indiscriminately, a bushing 68 is force-fitted into an opening 69 in the spring arm 30. The spring arm 30 is desirably bulged on each side of the opening 69 as indicated by numeral 70 in Fig. 11, so that said opening 69 does not decrease the strength of the spring 30. The underside of the bushing 68 is provided with a concavity 71, which receives the now rounded end 72 of the rod 18. With this construction, a slight lateral movement of the rod 18 is without effect upon the operation of the spring 30.

Fig. 12 shows another manner of adjusting the operating temperature of the thermostatic disc 9. In this embodiment, the operating temperature adjusting means is operative directly upon the disc 9, instead of upon the rod 18. The cup-shaped portion 5 of the base plate 4 is deepened, and upon its top is mounted a smaller cup-shaped housing or cover 73. The cover 73, while circular, is not coaxial with the base plate 4.

Inside the cup portion 5 is mounted, as by welding, a spring arm 74 which extends diametrically across the housing and has a downward-turned end 75 (see also Fig. 14). The end 75 is provided with a concavity 76 which rests against one of the corrugations of the disc 9. The other end of the lever 74 is bent to provide a tab 77 which is welded to the inner wall of the cup portion 5 for the aforesaid mounting. An elongated opening 78 in the spring lever 74 provides free passage for the tube 17, which now projects into the cup portion 5 and terminates in such manner as to constitute an upward stop or movement-limiting means for the thermostatic disc 9.

A collapsible bellows element 79 is mounted on top of the base plate 4 within the cover 73, its open end 80 being welded or soldered to the face of the base plate 4 in such manner as to preserve the hermetical seal. The closed end of the bellows 79 carries a pillow block 82 which is engaged by the end of a screw 83 threaded into the top of the cover 73. A knob 84 provides for manual adjustment of the position of the screw 83. A pin 85, which has a flanged head 86, reacts between the inside surface of the closed upper end 81 of the bellows 79 and the spring lever 74. Thus, threading of the screw 83 downward places a greater tension in the spring lever 74, and through engagement of the end 75, a greater resilient pressure on the disc 9. This said greater pressure has a tendency to increase the snapping temperature of the disc in its upward movement, in much the same manner as heretofore described in connection with the embodiment of Fig. 7.

The foregoing manner of controlling the operating temperature of the disc 9 is more fully described and claimed in my Patent Number 1,972,832, dated September 4, 1934.

A disadvantage of the embodiment of Figures 12 and 13 is that the structure unduly increases the thermal capacity of the thermally responsive portion 1 of the control as a whole. This is because an additional quantity of metal, incident to all of the adjusting elements, is provided in the same conductive region as the disc 9, and the entire body of metal thus provided must undergo temperature change before the disc 9 undergoes such change.

Fig. 15 illustrates an embodiment of the invention wherein this unduly increased heat capacity is eliminated and the adjusting means of the Fig. 12 embodiment are still used. Numeral 87 indicates a second tube sealed to both the cup portion 5 of the base plate 4 and to the base plate 22, similar to the manner in which the tube 17 is sealed. Slidably fitting within the tube 87 is a rod 88, which in effect comprises an elongation of the pin 85 of the Fig. 12 embodiment. In the Fig. 15 embodiment, the cover 73 and bellows 79 are mounted on top of the cover 26, and the rod 88 extends entirely across the contact chamber and into the bellows 79 in the cover 73. In this manner, a substantial portion of the metal elements required for the adjusting means is removed from the immediate vicinity of the thermostatic disc 9, and the heat capacity of the thermally responsive portion of the control is thus reduced.

Numeral 89 indicates a pointer which is mounted to cooperate with suitable indicating marks on the knob 84 for indicating the temperature at which the disc 9 is set to operate. Similar pointers may be provided for the other embodiments of the invention.

Fig. 15, it will be understood, is an axial section taken at right angles to the remainder of the axial sections of the drawings.

While in all of the embodiments of the invention heretofore described, the controlled means has been in the form of an electric switch, it will readily be seen that other controlled devices may be used, such as valves and the like.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:
1. A thermostatic control comprising a hermetically sealed envelope substantially entirely formed from a material of high heat conductivity, a snap-acting thermostatic plate within said envelope, a controlled device within said envelope, and means connecting the plate and the controlled device for transmitting movement of the plate to the controlled device.

2. A thermostatic control comprising a snap-acting thermostatic disc, metallic housing means hermetically enclosing said disc, electric switching elements, metallic housing means hermetically enclosing said switching elements, metallic means connecting said disc housing and the switch housing together in hermetically sealed relationship, and means enclosed by said last-named means for transmitting movement of said thermostatic disc to at least one of said electrical switching elements.

3. A thermostatic control comprising a snap-acting thermostatic disc, metallic housing means hermetically enclosing said disc, electric switching elements, metallic housing means hermetically enclosing said switching elements, metallic means connecting said disc housing and the switch housing together in hermetically sealed relationship, means enclosed by said last-named means for transmitting movement of said thermostatic disc to at least one of said electrical switching elements, and means for controlling the operating temperature of said thermostatic disc available for manipulation outside one of said housing means.

4. A thermostatic control comprising a snap-acting thermostatic disc, metallic housing means hermetically enclosing said disc, electric switching elements, metallic housing means hermetically enclosing said switching elements, metallic means connecting said disc housing and the switch housing together in hermetically sealed relationship, means enclosed by said last-named means for transmitting movement of said thermostatic disc to at least one of said electrical switching elements, and means mounted on and available for manipulation outside of said switch housing engaging said movement-transmitting means for controlling the operating temperature of said thermostatic disc.

5. A thermostatic control comprising a snap-acting thermostatic disc, metallic housing means hermetically enclosing said disc, electric switching elements, metallic housing means hermetically enclosing said switching elements, metallic means connecting said disc housing and the switch housing together in hermetically sealed relationship, means enclosed by said last-named means for transmitting movement of said thermostatic disc to at least one of said electrical switching elements, and means mounted on and available for manipulation outside of said disc housing for controlling the operating temperature of said thermostatic disc.

6. A thermostatic control comprising a snap-acting thermostatic disc, metallic housing means hermetically enclosing said disc, electric switching elements, metallic housing means hermetically enclosing said switching elements, metallic means connecting said disc housing and the switch housing together in hermetically sealed relationship, means enclosed by said last-named means for transmitting movement of said thermostatic disc to at least one of said electrical switching elements, and lead-in means hermetically sealed in glass in said switch housing for establishing connections thereto without destroying the hermetically sealed character of said housing.

7. In a thermostatic control, a thermally responsive element, means for adjusting the operating temperature of said thermally responsive element comprising a second thermally responsive element mounted to exert a resilient force on the first thermally responsive element, and heating means adapted to vary the temperature of said second thermally responsive element without substantially affecting the temperature of said first thermally responsive element.

8. In a thermostatic control, a thermally responsive element, means for adjusting the operating temperature of said thermally responsive element comprising a second thermally responsive element mounted to exert a resilient force on the first thermally responsive element, and heating means adapted to vary the temperature of said second thermally responsive element without substantially affecting the temperature of said first thermally responsive element, the varying temperature of said second thermally responsive element resulting in the imposition of varying pressures on the face of said first thermally responsive element.

9. In a thermostatic control, a snap-acting thermostatic disc, means for adjusting the operating temperature of said disc comprising a thermally responsive element mounted to exert a resilient force on said disc, and heating means adapted to vary the temperature of said thermally responsive element without substantially affecting the temperature of said disc.

10. In a thermostatic control, a snap-acting thermostatic disc, means for adjusting the operating temperature of said disc comprising a strip formed of thermostatic metal and mounted to exert a resilient force on said disc, and heating means adapted to vary the temperature of said strip without substantially affecting the temperature of said disc, said heating means being without substantial heating effect on said disc.

11. A thermostatic control comprising a hermetically sealed metallic envelope, a snap-acting composite thermostatic material plate within said envelope responsive by movement to temperature changes both internally and externally of the envelope, an electrical resistance heating element likewise within said envelope and adapted to vary the internal temperature of the envelope and hence of said thermostatic plate, and means for making external connections to the electrical resistance heating means.

12. A thermostatic control comprising a hermetically sealed metallic envelope, a snap-acting composite thermostatic material plate within said envelope responsive by movement to temperature changes both internally and externally of the envelope, electrical switching means within said envelope controlled by said thermostatic plate, and an electrical resistance heating element likewise within said envelope and adapted to vary the internal temperature of the envelope and hence of said thermostatic plate, and means for making external connections to both the electrical resistance heating means and the electrical switching means.

13. A control means including a sealed casing containing a mechanical switch means to be opened and closed for controlling the flow of electric energy through an electric circuit, said switch means being connected to electrical conductors extending through the wall of the sealed casing, said conductors being hermetically sealed in the wall of the casing, a temperature responsive means including a mechanical operating portion within said sealed casing for opening and closing said switch means, external adjustment means for said control means, and hermetically sealed means operated by said external adjusting means for adjusting the operating portion of said temperature responsive means.

JOHN A. SPENCER.